(12) United States Patent
De Santis et al.

(10) Patent No.: US 7,433,692 B2
(45) Date of Patent: Oct. 7, 2008

(54) METHOD FOR DIMENSIONING A MOBILE TELECOMMUNICATIONS NETWORK

(75) Inventors: Emanuele De Santis, Turin (IT); Giuseppe Minerva, Turin (IT); Emanuele Silio, Turin (IT)

(73) Assignee: Telecom Italia S.p.A., Milan (IT)

( * ) Notice: Subject to any disclaimer, the term of this patent is extended or adjusted under 35 U.S.C. 154(b) by 285 days.

(21) Appl. No.: 10/552,992

(22) PCT Filed: Apr. 14, 2003

(86) PCT No.: PCT/EP03/03853

§ 371 (c)(1), (2), (4) Date: Oct. 13, 2005

(87) PCT Pub. No.: WO2004/091237

PCT Pub. Date: Oct. 21, 2004

(65) Prior Publication Data

US 2006/0246912 A1 Nov. 2, 2006

(51) Int. Cl.
*H04Q 7/20* (2006.01)

(52) U.S. Cl. .................. 455/445; 455/446; 455/447; 455/448; 455/450; 455/451; 455/452.1; 455/452.2; 455/453; 455/454

(58) Field of Classification Search ............... 455/446, 455/447, 448, 450, 451, 452.1, 452.2, 453, 455/454, 436

See application file for complete search history.

(56) References Cited

U.S. PATENT DOCUMENTS

| 5,504,938 | A  | * | 4/1996  | Redden ...................... 455/436 |
| 5,848,357 | A  | * | 12/1998 | Dehner et al. ............... 455/447 |
| 5,920,607 | A  | * | 7/1999  | Berg ........................ 379/1.01 |
| 5,974,318 | A  | * | 10/1999 | Satarasinghe ............... 455/436 |
| 6,928,056 | B2 | * | 8/2005  | Evans ......................... 370/244 |
| 6,970,709 | B1 | * | 11/2005 | Williams ................. 455/452.1 |

FOREIGN PATENT DOCUMENTS

| WO | WO-02/052869 A2 | 7/2002 |
| WO | WO-02/080602 A1 | 10/2002 |

* cited by examiner

*Primary Examiner*—David Q Nguyen
(74) *Attorney, Agent, or Firm*—Finnegan, Henderson, Farabow, Garrett & Dunner, L.L.P.

(57) ABSTRACT

A method for assessing the characteristics obtainable in a network for mobile telecommunications apparatuses suitable for managing calls with both data traffic and/or voice and data traffic. On the basis of the performance requested for the quantity and characteristics of the traffic required, the method provides a simple manner for determining both the effective performance of the network in terms of the probability of occupation of the radio channels and the probability of dropped calls during the peak traffic period and optimal dimensioning of the network.

10 Claims, 2 Drawing Sheets

METHOD FOR DIMENSIONING A MOBILE TELECOMMUNICATIONS NETWORK

CROSS REFERENCE TO RELATED APPLICATIONS

This application is a national phase application based on PCT/EP2003/003853, filed Apr. 14, 2003, the content of which is incorporated herein by reference.

TECHNICAL FIELD

This invention refers to a method for assessing the characteristics of a network for mobile telecommunications apparatuses on the basis of parameters such as the number of radio resources (base stations) available and the amount of telephone traffic offered to it.

In particular, this invention relates to a method for assessing the characteristics in terms of dimensioning and performance of base stations of a GSM-GPRS type network (Global System for Mobile communications—General Packet Radio Service on mobile networks) which, as is known, uses a hybrid radio interface based on Frequency Division Multiple Access (FDMA) and Time Division Multiple Access (TDMA), and which makes it possible to manage both voice calls and data calls.

The method therefore is concerned with the assessment of the correct dimensioning and performance of radio resources on the basis of the number and duration of the voice telephone calls (voice traffic) and the number of and volume of information to transmit in data calls (data traffic) and of the priority attributed to voice traffic calls compared with data traffic ones.

The method, in particular, concerns the determination of death probability of data calls associated to a determined status or configuration of the network.

BACKGROUND ART

Networks for mobile telecommunications apparatuses are known.

These networks are generally described as cellular and they are distinguished by a plurality of cells, each defined as the group of territorial points served by the radio-electric signal radiated by an antenna (radio interface).

Apart from the intrinsic mobility of users, the main peculiarity of networks of mobile apparatuses is the use of the radio interface as access port to the network itself.

It is also known that dimensioning and performance assessments of telecommunications networks or systems in which the offered traffic is composed of voice and data traffics, can be evaluated by using the method described in WO 02/080602. The known method is based on an M/M/N/Q model in which the system servers correspond to the cell traffic slots and the status of the cell is represented by the number of GPRS users in the system; this model takes into account:

- a queue of infinite length (Q=∞) on the basis that, in the case of congestion of the traffic resources, each GPRS user makes multiple access attempts to the system;
- an average queue waiting time (for one GPRS user) expressed as a function of the time necessary for the mobile terminal to make the multiple access attempts to the system;
- that the entire message is deemed to have been put in the queue;
- an inter-arrival time between the data calls (arrivals process) having exponential distribution with parameter $\lambda$ equal to the frequency of the arrivals;
- an average call duration (service time $\tau$) having exponential distribution with parameter $\mu=1/\tau$ equal to the call death intensity;
- an average waiting time in the queue having exponential distribution with parameter a equal to the frequency of the dropped calls (user "impatience").

As far as the characteristics of the GPRS data service are concerned, the known method takes into account that:

- each user (or, rather, each GPRS mobile terminal) attempts to access the system, in accordance with various policies, for a predetermined number of seconds with multiple attempts; if the user has been unable to access the radio slot at the end of this time period, the call is blocked;
- access to the radio slot in the system is gained, in a known manner, on a call basis and not for the individual message packet;
- the transmission speed of the message, after obtaining the radio resource, depends on the number of users multiplexed on the GSM time slot; this number goes, for example, from a minimum of one user to a maximum of eight; as a consequence of this, the speed, as is known, can vary during transmission of the single message on the basis of the number of users who access the GSM-GPRS cell.

According to the known method the data traffic "A" offered to the cell is evaluated by means of the following relation:

$$A = \frac{\lambda}{\mu} = \lambda \cdot \tau$$

where:

$$\tau = \frac{nL}{v_{canal}} = \frac{1}{\mu}$$

minimum service time of a data call;

and $v_{canal}$ speed of the single server;

n·L length of the message (n packets of length L).

By knowing the number of slots available at any moment for the GPRS service, the set of possible status associated with a cell is then summed up in flow balancing equations required for calculating the various status probabilities, given by the relation:

$$P_x = P_0 \frac{\lambda_0 \lambda_1 \ldots \lambda_{x-1}}{\mu_1 \mu_2 \ldots \mu_x}$$

where $P_0$ is the probability of the system being in status 0; the set of probabilities is then normalised by means of the $P_0$ normalisation relation, corresponding to the formula:

$$P_0 = \left(1 + \sum_{k=1}^{\infty} \prod_{i=0}^{k-1} \frac{\lambda_i}{\mu_{i+1}}\right)^{-1}.$$

In the known system, the voice traffic has priority over the GPRS data calls (preemption) and it is necessary to weigh up the various possible configurations of slots available for the data service with the probability, linked to voice traffic only, of each configuration effectively occurring. For this purpose, the state of the art makes it possible to assess the probabilities of having x channels or slots left free by voice, and therefore usable by the GPRS service, through the relation:

$$\begin{cases} P^D(x) = P^V(C-x) & 1 \le x < D \\ P^D(D) = \sum_{i=0}^{C-D} P^V(i) \end{cases}$$

where C represents the number of channels of a cell, D corresponds to the maximum number of channels allocable for data (static plus dynamic) and $P^V(i)$ is the probability of having "i" channels occupied by voice, given by the relation of a known kind:

$$P^V(i) = \frac{\frac{(A_{voice})^i}{i!}}{\sum_{j=0}^{C-1} \frac{(A_{voice})^j}{j!}}.$$

where $A_{voice}$ represents the voice traffic offered to the cell.

The effective performance of the cell (probability of data block and user throughput) is therefore given by the following relations:

$$B_D = \sum_{x=1}^{D} B(x) \cdot P^D(x)$$

average probability of data block;

$$R_D = \sum_{x=1}^{D} ET(x) \cdot P^D(x)$$

average data delay;

where B(x) and ET(x) are the average data loss probability and the average delay associated to the configuration with "x" channels available for data traffic.

The user throughput is calculated on the basis of the average delay, by means of the relation (of known type):

$$\frac{n \cdot L}{R_D}$$

with message length n·L.

In the specific case of the GSM-GPRS network, data traffic for the various types of service is managed (served) using radio carriers of predefined frequency and, in the framework of each radio carrier (FDMA access technique), by a given slot (the logic channel) among those periodically available in the framework of the time frame used on the radio interface (TDMA access technique). In this context, if even one user requests a data transmission, one or more whole slots of the GSM time frame are assigned to the user as a function of the terminal capability (preferred number of time slots requested to the network) of the mobile station; this implies a given transmission speed, for example 9.05 kbit/s nominal per slot, for the data encoding denominated CS-1, or 13.4 kbit/s nominal per slot for the date encoding denominated CS-2.

If, on the other hand, several users simultaneously request data transmission, one or more slots are subdivided among the users themselves, with a consequent drop in the transmission speed which will therefore be a function of the number of active users in the system (cell) at that moment; in a more intuitive manner, the generic user notes a net data transmission speed which varies with time on the basis of the load conditions in the system.

In other words, the known method for determining the call death probability associated to a determined network status is based on considering that each terminal on the cell uses a same capability.

From Applicant's analysis of the known method, it emerges that the methodology for assessing dimensioning and performance of the base stations of a network for mobile telecommunications apparatuses is inadequate.

In fact, a cell of a real network comprises data terminals requesting different numbers of time slots to the network for transferring data.

DISCLOSURE OF THE INVENTION

Object of this invention is the implementation of a method for assessing the dimensioning and performance of base stations in a network for mobile telecommunications apparatuses which does not have the limit described in the known state of the art and which takes into account the coexistence of data calls associated to different terminals having different capabilities or preferred number of time slots requested to the network.

This object is achieved by the method as described in the claims.

In particular, object of present invention is a method for determining call death probabilities associated to a determined status of a network cell when the network comprises data terminals having different terminal capabilities.

Moreover, object of present invention is a computer program product loadable into internal memory of computers for implementing the method of the invention as well as the network dimensioned by using the method of the invention.

BRIEF DESCRIPTION OF DRAWINGS

This and the other features of this invention will be clear from the following description of a preferred form of embodiment, provided for exemplificative and not limitative purposes, with the aid of the attached drawings, in which.

BEST MODE FOR CARRYING OUT THE INVENTION

Figure 1:
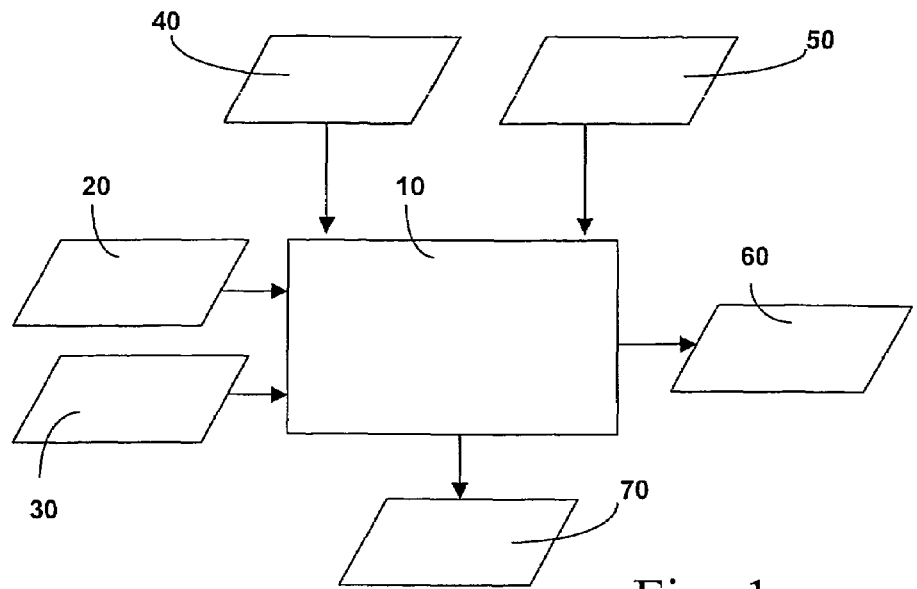
FIG. 1 shows a diagram of the inputs needed for applying the method for assessing the characteristics of a base station for mobile telecommunications apparatuses, according to the invention, and the outputs guaranteed by the method itself.

With reference to FIG. 1, a method 10 for assessing the characteristics in terms of dimensioning and performance of a mobile telecommunications network, for example a GSM-GPRS mobile telecommunications network, envisages a set of inputs composed, in detail, of performance required for the voice traffic (voice loss) 20, of performance required for the data traffics (data loss or user throughput for each traffic stream characterised by a different terminal capability) 30, of descriptions of the offered voice traffic (Erlang) 40 and of descriptions of the offered data traffic (GPRS traffic) 50 composed of the call arrival frequency and terminal capability of the data calls for each traffic stream and average length of the individual message.

The method 10, according to the invention, is suitable for supplying both an optimal dimensioning 60 of the GSM-GRPS cell (number of radio carriers) given the required performance 20 and 30, and the traffic offered, 40 and 50, and the effective performance 70 of the cell itself given the inputs 20, 30, 40 and 50.

In particular, from the operative point of view, the method 10 for assessing the dimensioning and performance of a base station in a mobile telecommunications network suitable for managing voice and data, a GSM-GPRS network for example, comprises a set of stages which can be grouped in six fundamental logical blocks.

Figure 2:
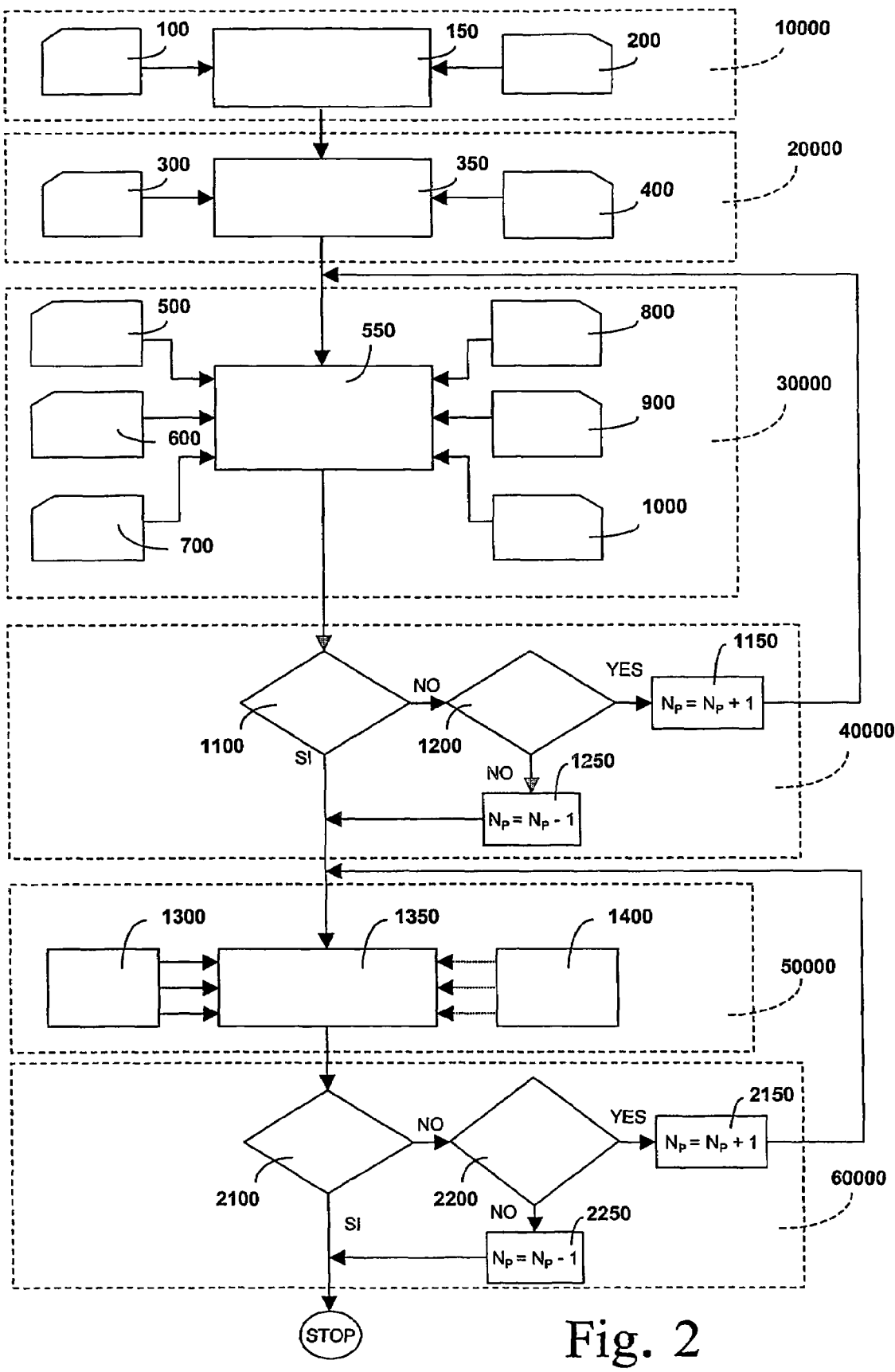
FIG. 2 is a flow diagram of the method according to the invention.

A first block 10000 (FIG. 2), of known type, suitable for assessing the number of traffic channels (slots) required (step 150) on the basis of the voice traffic to handle or Erlang 40 offered to the cell (step 100) and under the constraint of guaranteeing a voice loss not greater than the voice loss 20 required for voice only (step 200).

A second block 20000, of known type, suitable for assessing the minimum number of radio carriers to allocate in the cell (step 350), on the basis of the number of signalling channels necessary (step 300), deducible, in a known manner, from the number of channels calculated in step 150 of the first block 10000, and on the basis of the number of channels (step 400) statically reserved for data traffic (50) only.

A third block 30000, as will be described in greater detail below, suitable for assessing the performance of the data traffic, in the section between the mobile terminal and the base station or uplink section (step 550), on the basis of
  number of radio carriers available obtained with step 350 of the second block 20000;
  offered data traffic characteristics having different
    data call arrival frequency,
    terminal capability,
    length of the packet,
    average number of packets per message (step 500), for each data traffic stream associated to a determined terminal capability;
  required performances of a data cell, i.e.
    average data call loss (step 600), and
    average delay (step 700);
  maximum numbers of channels allocable dynamically to the data services (step 800);
  parameters indicating the maximum length of waiting time in the queue of a data call (step 900); and
  codification used for data transmission (step 1000), for example parameters relating to the type of GPRS encoding used.

A fourth block 40000, substantially for assessing the results obtained, suitable for confirming, increasing or reducing the number of radio carriers used by the third block 30000, comprising a first control step for controlling if the performance satisfies the dimensioning requirements (step 1100).

If the outcome is positive, this step 1100 completes the block 40000 and, if the outcome is negative, it leads to a second control step for controlling if an improvement has been obtained in the step 30000 in the cell performances compared with any previous situation (step 1200).

In the event of a negative outcome, this step 1200 leads to a step (step 1250) suitable for returning the number of channels to those used in block 30000 representative of a previous situation, and in the case of a positive outcome it leads to an increase in the number of channels (step 1150), if possible, knowing the maximum number of carriers allocable in a GSM cell, and to repetition of block 30000.

A fifth block 50000 for assessing the performance of the data traffics in the section between the base station and the mobile terminal or down-link section (step 1350), on the basis of the number of radio carriers available (confirmed or calculated in blocks 30000 and 40000), on the basis of the set of inputs relating to the data traffic offered (step 1300) as described for steps 500, 600 and 700 of the block 30000 and on the basis of the set of configuration parameters (step 1400) as described in steps 800,900 and 1000 of block 30000.

A sixth block 60000 substantially for assessing the results obtained, suitable for confirming, increasing or reducing the number of radio carriers used by the fifth block 50000; this block 60000 is substantially equivalent to block 40000, already described, and comprises steps 2100, 2200, 2250 and 2150 respectively equivalent to steps 1100, 1200, 1250 and 1150 already described.

Knowing the maximum number of carriers allocable in a cell of mobile apparatuses, of the GSM type for example, block 60000 leads to completion of method 10, according to the invention, recycling on block 50000 where applicable.

In the method according to the invention, the first two blocks 10000 and 20000 will only be described in broad lines, just like blocks 40000 and 60000; blocks 30000 and 50000, on the other hand, include innovative components due to the different data traffic characteristics considered with respect to the state of the art and will be described in detail.

The functions carried out by the various blocks are implemented, in accordance with the object of this invention, in the form of programs on a computer and make it possible to determine the characteristics of a network for mobile telecommunications apparatuses.

The operation of method 10 for assessing the dimensioning and performance of a cell in a mobile telecommunications system is described taking a network of the GSM-GPRS type as reference, even though it can be understood by technicians in the sector that the method 10 is easy to extend to mobile networks suitable for managing data traffic and/or voice and data traffic.

In particular, the dimensioning as described can be advantageously applied to networks of type TDMA and FDMA/TDMA.

The first block 10000 makes it possible to assess the minimum number of traffic channels (slots) required (step 150) to handle the voice traffic offered (Erlang) to the cell (step 100), under the constraint of guaranteeing a voice loss not greater than the voice loss required for voice only (step 200).

For this purpose, step 150 of block 10000 uses the formula called "Erlang-B", known as such (model M/M/N) in first and second generation fixed and mobile telecommunications networks which, on the basis of known input data, provides the number of traffic channels to allocate in the GSM-GPRS cell to handle the traffic expressed in Erlang with the requested performance (voice drop-out).

The second block 20000 makes it possible to assess the number of radio carriers (FDMA access technique) to allocate in the cell, assuming the following as known:

the total number of traffic channel (TDMA access technique) associated with each radio carrier which, as is known, is eight channels in the case of the GSM system;

the rule of association, known as such, between the number of traffic channels calculated by the first block 10000 and the number of signalling channels needed for managing the cell (step 300);

the number of channels allocated statically to the GPRS traffic, and therefore not usable in any case by voice traffic (step 400); in general this is a design parameter.

In accordance with this invention, the third block 30000 makes it possible to assess the performance of data traffic (losses and user throughputs) (step 550) in the uplink section on the basis of a plurality of input data, of characteristics of the GPRS data service and of assumptions regarding the method and model. In particular, as far as the input data are concerned, step 550 takes into account:

the characteristics of the data traffics offered to the cell; that is, for each data traffic stream, the call arrival frequency, the terminal capability, the length of the packet and the average number of packets per message (step 500);

the data call loss requested for each data traffic stream (step 600);

the user throughput requested for each data traffic stream (step 700);

the maximum number of channels dynamically allocable to the data calls (step 800), that is, usable by the GPRS data traffics and left free by the GSM voice traffic;

the maximum waiting time in the queue of a GPRS data call (step 900);

the GPRS encoding for transmission of the data (step 1000);

the number of carriers calculated by the second block 20000 in step 350.

As far as the characteristics of the GPRS data service are concerned, block 30000 and the method take into account, for the purpose of modelling the behaviour of the GSM-GPRS cell for data traffic only (GPRS traffic):

an M/M/N/Q model in which the system servers correspond to the cell traffic slots and the status of the cell is represented by the vector $m=\{m_1, m_2, \ldots, m_N\}$, where the term $m_i$ represents the number of GPRS users in the system belonging to the traffic stream i-th;

a queue of infinite length ($Q=\infty$) in the case of congestion of the traffic resources wherein each user makes multiple access attempts;

an average queue waiting time (for one GPRS user) expressed as a function of the time necessary for the mobile terminal to make the multiple access attempts; the entire message put in the queue;

an inter-arrival time, for traffic stream i-th, between the data calls (arrivals process) characterised by exponential distribution with parameter $\lambda_i$ equal to the data call arrival frequency (in this way, the description of the global arrivals process associated to the complete set of traffic streams is given by the vector $\lambda=\{\lambda_1, \lambda_2, \ldots, \lambda_N\}$);

an average call duration (service time $\tau$) characterised by exponential distribution with parameter $\mu=1/\tau$ equal to the call death intensity;

an average waiting time in the queue characterised by exponential distribution with parameter $\alpha$ equal to the frequency of the dropped calls (user "impatience").

On the basis of what has been listed, block 30000 makes it possible to assess the vector of data traffics $A=\{A_1, A_2, \ldots, A_N\}$ offered to the cell by means of the following relations:

$$A_i = \frac{\lambda_i}{\mu} = \lambda_i \cdot \tau$$

for traffic stream i-th;

where:

$$\tau = \frac{nL}{v_{canal}} = \frac{1}{\mu}$$

minimum service time of a data call;

and $v_{canal}$ speed of the single server;

n·L length of the message (n packets of length L).

According to a feature of present invention, the performance of the cell on the uplink section (probabilities of data block and average user throughputs) are assessed using modelling of the cell status based on two different types of "cell status" characterised by the presence of N different data traffic streams.

If $m=\{m_1, m_2, \ldots, m_N\}$ is the vector of GPRS users in the system, we get:

the status 110000 (FIG. 3, FIG. 2) concerning a two-dimension case for a simpler explanation, in which the number of GPRS users in the system (described by vector $m=\{m_1, m_2\}$) does not exceed the maximum number of data connections simultaneously supportable by the cell, where the number of slots available in a given moment for the data service is known; in this case the system exits the state "$m_1, m_2$" because of the birth of a new data call (with data call arrival frequencies $\lambda_1$ and $\lambda_2$) or because of the death of a call in progress; the global frequency of the death is k·μ, where k is the number of GSM slots occupied by one or more GPRS users.

The frequency of the death associated to each traffic stream is evaluated by means of a repartition of the global frequency of the data call death.

According to present invention, a set of models is defined for permitting to evaluate in a simple and fast way the medium frequency of the death related to each single traffic stream; this medium frequency, according to present embodiment, depends on the following parameters:

$m_1$ number of users belonging to data traffic stream 1;
$m_2$ number of users belonging to data traffic stream 2;
$C_1$ terminal capability associated to data traffic stream 1;
$C_2$ terminal capability associated to data traffic stream 2;
N number of slots available for data traffics;
k number of slot occupied by data traffics;

$M_{max}$ maximum number of users multiplexed on a time slot;

and it also depends on the following conditions:

if $m_1 \cdot C_1 + m_2 \cdot C_2 \leq N$
then $a'(m_1, m_2) = m_1 \cdot C_1$
$b'(m_1, m_2) = m_2 \cdot C_2$
$a'(m_1, m_2) + b'(m_1, m_2) = k$
if $m_1 \cdot C_1 + m_2 \cdot C_2 > N$
$m_1 \cdot C_1 + m_2 \cdot C_2 \leq N \cdot M_{max}$
then $$a'(m_1, m_2) = \frac{m_1 \cdot C_1}{m_1 \cdot C_1 + m_2 \cdot C_2} \cdot N$$

$$b'(m_1, m_2) = \frac{m_2 \cdot C_2}{m_1 \cdot C_1 + m_2 \cdot C_2} \cdot N$$

defined $C_R$ as the reduced terminal capability (reduced number of used time slots respect to preferred number of time slots requested to the network) associated to data traffic stream 1 or 2;

and under the hypothesis that only one user accesses the system with a reduced terminal capability (the last user accessing the system before the filling up of the queue)

if $m_1 \cdot C_1 + m_2 \cdot C_2 > N \cdot M_{max}$
$m_1 \cdot C_1 + m_2 \cdot C_2 < N \cdot M_{max} + \min(C_1, C_2)$
then $$a'(m_1, m_2) = \frac{m_1 \cdot C_1}{m_1 \cdot C_1 + (m_2 - 1) \cdot C_2 + 1 \cdot C_R} \cdot N$$

$$b'(m_1, m_2) = \frac{(m_2 - 1) \cdot C_2 + 1 \cdot C_R}{m_1 \cdot C_1 + (m_2 - 1) \cdot C_2 + 1 \cdot C_R} \cdot N$$

in the example above the reduced terminal capability regards the data traffic stream 2 but can concern also data traffic stream 1 if the last user accessing the system belongs to the first traffic; in that case the above models have to be modified considering the reduced terminal capability associated to data traffic stream 1;

if $m_1 \cdot C_1 + m_2 C_2 \geq N \cdot M_{max} + \min(C_1, C_2)$;
$m_1 \cdot C_1 + m_2 \cdot C_2 < N \cdot M_{max} + \max(C_1, C_2)$ $C_2 > C_1$
then $$a'(m_1, m_2) = \frac{m_1 \cdot C_1}{m_1 \cdot C_1 + (m_2 - 1) \cdot C_2 + 1 \cdot C_R} \cdot N$$

$$b'(m_1, m_2) = \frac{(m_2 - 1) \cdot C_2 + 1 \cdot C_R}{m_1 \cdot C_1 + (m_2 - 1) \cdot C_2 + 1 \cdot C_R} \cdot N$$

the same reduced terminal capability can regard the data traffic stream 1 under the opposite condition $C_1 > C_2$; in that case the above models have to be modified considering the reduced terminal capability associated to the first traffic.

the status 210000, in which the number of GPRS users in the system (described by vector $m = \{m_1, m_2\}$) exceeds the maximum number of data connections simultaneously supportable by the cell, where the number of slots available in a given moment for the data service is known; in this case the system exits the state "$m_1, m_2$" because of the birth of a new data call (with data call arrival frequencies $\lambda_1$ and $\lambda_2$) or because of the death of a call in the systems as a result of two causes:

the completion of a call in progress which occurs with death global frequency equal to $N \cdot \mu$, where N is the maximum number of slots usable by the data service;

the departure of a data call from the queue as a result of termination of the waiting time envisaged by the system which occurs with a death global frequency equal to $N_Q \cdot \alpha$, where $N_Q = m_1 + m_2 - c(m_1, m_2)$ corresponds to the total number of GPRS users (belonging to data traffic streams 1 and 2) in the queue who each contribute with an additional term equal to $\alpha$.

Also in this case, the frequency of the death associated to each traffic stream is evaluated by means of a repartition of the global frequency of the data call death.

In particular, according to present embodiment, it is convenient to evaluate each frequency of the death a" and b" starting from the frequency of the death given by $N \cdot \mu$ for the connected users and, in addition, the frequency of the death a'" and b'" starting from the frequency of the death given by $N_Q \cdot \alpha$ for the queued users.

In this context, according to present invention, an improvement is not only the use of the set of models described for the state 110000 but also the definition of a fast and efficient algorithm devoted to the evaluation of SQ possible sequences of users accessing the system for the state $m = \{m_1, m_2\}$; to each sequence it is associated a specific repartition of the frequencies of the death $N \cdot \mu$ and $N_Q \cdot \alpha$.

The model described below permits to build in a very simple way S sets of sequences or "configurations" characterised in that the sequences belonging to a single set have the same repartition of the frequency of the death and each of the S sets of sequences has a different repartition of the frequency of the death.

In particular, according to present embodiment, for each set it is considered only one configuration as representative of all the possible permutations having the same repartition of the frequency of the death.

In this way it is possible to reduce in a huge way the amount of elaborations and to calculate only the S<<SQ different configurations.

As consequence of this, the frequency of the death associated to each data traffic stream depends on the following parameters:

$m_1$ number of users belonging to data traffic stream 1;
$m_2$ number of users belonging to data traffic stream 2;
$C_1$ terminal capability associated to data traffic stream 1;
$C_2$ terminal capability associated to data traffic stream 2;
N number of slots available for data traffics;
$M_{max}$ maximum number of users multiplexed on a time slot.

Given the vector $m = \{m_1, m_2\}$, the components of the frequency of the death associated to each traffic stream can be evaluated as follows:

1. it is built the "configuration j" of access to the cell in which before enter the system users characterised by the smaller terminal capability (in the example is $C_1 < C_2$)

$C_1 C_1 C_1 C_1 \ldots C_1 C_2 C_2 C_2 C_2 \ldots C_2$
   \_\_\_\_\_$m_1$\_\_\_\_\_ \ldots \_\_\_\_\_$m_2$\_\_\_\_\_

2. it is evaluated the "access cut" in which the capacity of the cell (given by the formula $N \cdot M_{max}$) is completely occupied $C_1 C_1 C_1 | C_1 \ldots C_1 C_2 C_2 C_2 C_2 \ldots C_2$
   \_\_\_\_\_$m_1$\_\_\_\_\_ \ldots \_\_\_\_\_$m_2$\_\_\_\_\_

3. it is calculated (using a set of binomial formulae) the number of possible "permutations", with the individuated "access cut", obtainable considering the vector m={m_1, m_2} of users characterising the status;
4. the two different components of frequency of the death associated to each data traffic stream are calculated for the "configuration j":
   for users connected to the N available time slots, the models described for state 110000 are applied to the set of users placed to the left of the "access cut"; in this way the terms a''$_j$(m$_1$, m$_2$;) and b''$_j$(m$_1$, m$_2$) are obtained;
   for users placed in the queue, it is calculated the repartition between the data traffic streams 1 and 2 and the terms a'''$_j$(m$_1$, m$_2$) and b'''$_j$(m$_1$, m$_2$) are evaluated;
   it is obvious that all "permutations" associated to the "configuration j" are characterised by the same frequencies of the death given by the set a''$_j$,a'''$_j$,b''$_j$,b'''$_j$;
5. it is built a new sequence or "configuration" inverting the position of two users belonging the first one to the data traffic stream 1 and the second one to the data traffic stream 2
   $C_1 C_1 C_1 C_1 \ldots C_2 C_1 C_2 C_2 C_2 \ldots C_2$
   $\underbrace{\phantom{xxxxxx}}_{m_1} \ldots \underbrace{\phantom{xxxxxx}}_{m_2}$
   the step 2 is repeated; if the new "access cut" is different from the previous also steps 3 and 4 are repeated and other "permutations", and therefore frequencies of the death, are calculated; if the new "access cut" is equal to the previous, step 5 is repeated until a new different "access cut" is obtained; the process based on steps 1, 2, 3, 4 and 5 is stopped when is obtained the "access cut" composed by users belonging to data traffic stream 2 only.

At the end of the process based on steps 1, 2, 3, 4 and 5, a certain number of "configurations" and a great number of "permutations" "i" are known in terms of components a''$_i$,a'''$_i$,b''$_i$,b'''$_i$; the total components a'',a''',b'',b''' are calculated as average of sets a''$_i$,a'''$_i$,b''$_i$,b''' $_i$ associated to the permutations evaluated.

In presence of N different data traffic streams the existence of possible infinite status due to a queue of infinite length, conducts to a further improvement of the method for limiting the number of status in order to calculate in an efficient way the set of status probabilities, as described below.

When N data traffic streams are offered to a multi-dimensional system characterised by an infinite queue, the evaluation of the set of status probabilities requests the building and resolution of a N-dimensional matrix with an infinite number of elements.

According to present invention it is provided a method for evaluating the maximum number of users $M_i^{max}$, associated to stream i-th, accessed in the system; this parameter is evaluated taking into account only stream i-th and offering its traffic to a mono-dimensional system; in this way $M_i^{max}$ is obtained identifying the state "j" in which the state probability $P_j$ becomes negligible (that is, very small).

In other words each of the traffic streams offered by terminals having a determined terminal capability is separately analysed (mono-dimensional evaluation).

This approach is considered adequate to limit the dimension of the problem and to guarantee an efficient time of elaboration.

Knowing all the frequencies of the death it is possible to build Q matrix that is a square "sparse matrix" with dimension $(M_1^{max} \cdot M_2^{max} \cdot \ldots \cdot M_N^{max})$.

Knowing the number of slots available at any moment for the GPRS service, the set of possible status probabilities associated to a cell is given by the relation:

$$\begin{cases} \bar{\pi} \cdot Q = 0 \\ \sum_{i=1}^{M_1^{max}} \sum_{j=1}^{M_2^{max}} \ldots \sum_{k=1}^{M_N^{max}} \pi_{1,j\ldots,k} = 1 \end{cases}$$

where $\pi_{i,j,\ldots,k}$ is the status probability of the system being in a status with i users belonging to data traffic stream 1, j users belonging to stream 2 and k users belonging to the last stream; $\bar{\pi}$ is the status probabilities vector.

Therefore, the number of possible status and of associated status probabilities is limited in number as resulting from the indexes of the above expressions.

Due to that, Jacobi method, for example, can be used to solve this system and to obtain the normalised status probabilities; after the evaluation of this set of probabilities, data block probability $B_i$ and data delay $ET_i$ associated to each data traffic stream i-th and total data block probability B and total data delay ET are evaluated.

In summary, according to present invention, the cell dimensioning is determined on the basis of a set of status probabilities $\pi_{i,j,\ldots,k}$ associated to a set of cell status wherein each status probability is determined on the basis of arrival data call frequencies and medium death frequencies of data calls associated to different type of terminals.

In particular, the medium death frequencies of each cell status are determined by considering the S sequences having each a determined repartition of the global frequency of the death.

What has been described so far, and underlined several times, must be intended as being associated with the number of slots available for the data service at a given moment. As this number varies in real time on the basis of the voice traffic which, in general, has priority over the GPRS calls, it is necessary to weigh up the various possible configurations of slots available for the data service with the probability, linked to voice traffic only, of each configuration effectively occurring. For this purpose, block 30000 makes it possible to assess the probabilities of having x channels left free by voice, and therefore usable by the GPRS service, through the relation:

$$\begin{cases} P^D(x) = P^V(C-x) \quad 1 \le x < D \\ P^D(D) = \sum_{i=0}^{C-D} P^V(i) \end{cases}$$

where D corresponds to the maximum number of slots allocable for data (static plus dynamic) and $P^V$(i) is the probability of having "i" slots occupied by voice, given by the relation of a known kind:

$$P^V(i) = \frac{\frac{(A_{voice})^i}{i!}}{\sum_{j=0}^{C-1} \frac{(A_{voice})^j}{j!}}$$

where $A_{voice}$ represents the voice traffic offered to the cell.

According to present invention, it is therefore possible to determine the effective performance of the cell by the following relations:

$$Bi = \sum_{x=1}^{D} B_i(x) \cdot P^D(x)$$

average probability of data block for data traffic stream i-th;

$$ET_i = \sum_{x=1}^{D} ET_i(x) \cdot P^D(x)$$

average data delay of data traffic stream i-th;

$$B = \sum_{x=1}^{D} B(x) \cdot P^D(x)$$

average call data loss;

$$ET = \sum_{x=1}^{D} ET(x) \cdot P^D(x)$$

average data delay;

where $B(x)$ and $ET(x)$ are the average data loss probability and the average delay (associated to the entire set of data traffic streams) when "x" time slots are available for data service.

User throughput is calculated in step 550 on the basis of the average delay, by means of the relation (of known type):

$$\frac{n \cdot L}{R_D}$$

with message length n·L.

Figure 3:
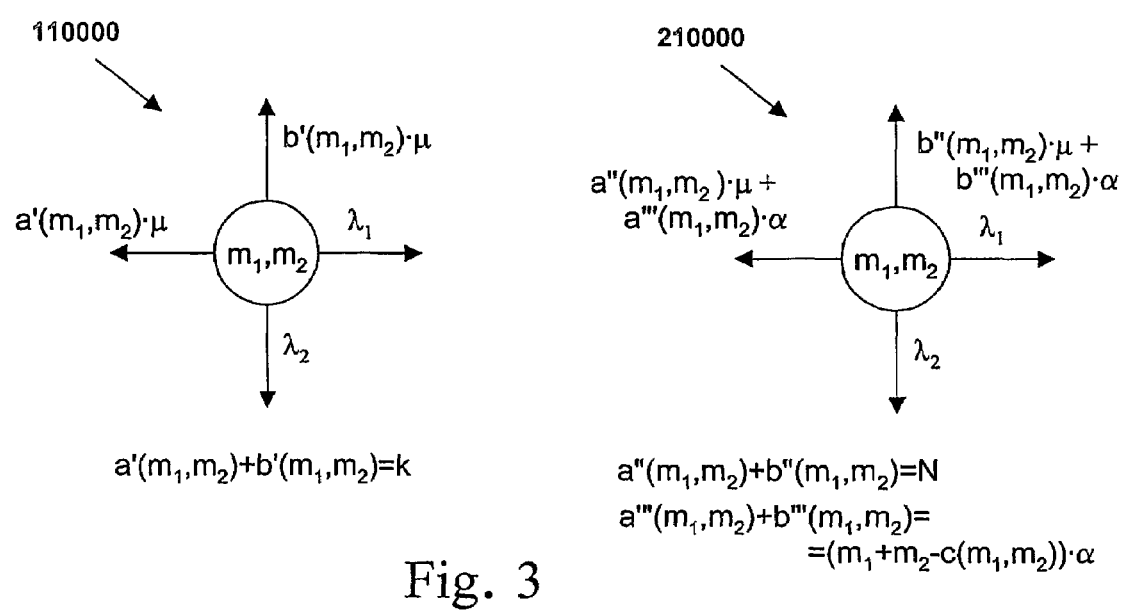
FIG. 3 is a description of a possible status of a cell of the GSM-GPRS type (in terms of the frequency of births and deaths of data calls provoking exit from the state itself) when the number of users for data traffic (GPRS users) in the system is not higher than the maximum permitted and when the number of GPRS users, present in the cell, is such as to require a part of the calls to be put in the queue.

Block 30000 comprises:
- a method for calculating the medium death frequencies associated to each typology of status of the cell as shown in FIG. 3;
- a method for limiting the number of status of the cell; such a method permits to apply, for example, the Jacobi method;
- a method for determining the effective voice loss, data loss and data user throughputs wherein the data performances are determined by means of models which give data losses (total and per stream) and average delays (total and per stream) on the basis of the probability of having "x" slots available for data traffics left free by voice calls.

The fourth block 40000 compares the quality of the performance assessed by the third block 30000 with the expected performance (call data loss and requested throughput) and decides the increase in the number of carriers in the cell (step 1150) if the performance is not met (step 1100) and if:
- the performance assessed is better compared with that obtained in the previous step (step 1200) and, of course, the maximum number of carriers allocable in a cell has not been reached.

Step 1100 makes it possible to avoid needless increase in the number of carriers if the performance, even if deemed unsatisfactory, cannot be further improved (this can occur if the number of slots allocable dynamically to the data service, the GPRS service for example, is fixed and cannot be increased even when increasing the number of carriers assigned to the cell); the limit constituted by the maximum number of carriers available takes account of the limits of the spectral bands and the rules which each mobile phone operator uses for carrying out radio dimensioning of the system base station.

The fifth block 50000, regarding the assessment of performance (data block probability and user throughput associated to each data traffic stream) for the downlink section, has identical characteristics, from the point of view of the method and model assumptions, to block 30000 regarding the opposite radio section (uplink section) and therefore reference should be made to that block.

The sixth block 60000 has identical characteristics to block 40000 and in this case too the description is omitted.

Obvious modifications or variations are possible to the above description, in the dimensions, forms, materials, components, circuitry elements, connections and contacts, as in the details of the circuitry and construction illustrated, and in the method of operating without straying from the spirit of the invention as specified in the claims which follow.

The invention claimed is:

1. A method for dimensioning a number of radio carriers in a cell of a mobile telecommunications network, the cell being suitable for managing data calls associated with data terminals having different terminal capabilities, the method comprising:
   categorizing the data calls as a plurality of data traffic streams, whereby each data traffic stream is associated with a different data terminal capability;
   identifying a set of possible cell statuses associated with the cell, each possible cell status corresponding to a different set of values $\{m_1, m_2, \ldots m_N\}$ where $m_i$ represents a number of data terminals associated with the $i^{th}$ data traffic stream and N represents the total number of data traffic streams;
   determining, for each data traffic stream, an upper limit for the number of data terminals that can be associated with the data traffic stream;
   limiting the number of possible cell statuses based on the upper limits respectively determined for the data traffic streams;
   determining, for each of the limited number of possible cell statuses, at least one sequence of data terminals used to access the cell;
   determining, for each of the limited number of possible cell statuses, one or more data-call death frequencies corresponding to frequencies with which data calls are terminated in the data traffic streams, the one or more data-call death frequencies for a possible cell status being determined based on the at least one sequence of data terminals used to access the cell in that possible cell status;
   determining, for each of the limited number of possible cell statuses, one or more data-call arrival frequencies corresponding to frequencies with which data calls are initiated in the data traffic streams;
   determining a set of cell status probabilities for the cell on the basis of the determined data-call arrival frequencies and data-call death frequencies; and
   dimensioning the cell on the basis of the determined set of cell status probabilities.

2. The method according to claim 1, further comprising:
separately analyzing each data traffic stream of the plurality of data traffic streams to determine the upper limit for the number of data terminals that can be associated with the data traffic stream.

3. The method according to claim 1, wherein the at least one determined sequence of data terminals is associated with a set of sequences having the same data-call death frequency.

4. The method according to the claim 1, wherein the network is a TDMA or TDMA/FDMA type network.

5. The method according to claim 1, wherein the network is a GPRS type network.

6. The method according to claim 1, wherein each determined upper limit corresponds to a maximum number of data terminals associated with a data traffic stream.

7. The method according to claim 6, further comprising:
determining the maximum number of data terminals associated with a data traffic stream based on a probability of having the maximum number of data terminals in the data traffic stream.

8. A cell of a mobile telecommunications network suitable for managing data calls associated with data terminals having different terminal capabilities, a number of radio carriers in the cell capable of being dimensioned by performing a method comprising:
categorizing the data calls as a plurality of data traffic streams, whereby each data traffic stream is associated with a different data terminal capability;
identifying a set of possible cell statuses associated with the cell, each possible cell status corresponding to a different set of values $\{m_1, m_2, \ldots m_N\}$ where $m_i$ represents a number of data terminals associated with the $i^{th}$ data traffic stream and N represents the total number of data traffic streams;
determining, for each possible cell status, one or more data-call death frequencies corresponding to frequencies with which data calls are terminated in the data traffic streams;
determining, for each possible cell status, one or more data-call arrival frequencies corresponding to frequencies with which data calls are initiated in the data traffic streams;
determining a set of cell status probabilities for the cell on the basis of the determined data-call arrival frequencies and data-call death frequencies; and
dimensioning the cell on the basis of the determined set of cell status probabilities.

9. A computer-readable medium storing instructions directly loadable in an internal memory of at least a computer and capable of being executed by at least the computer, the instructions including software code portions capable of performing a method for dimensioning a number of radio carriers in a cell of a mobile telecommunications network, the cell being suitable for managing data calls associated with data terminals having different terminal capabilities, the method comprising:
categorizing the data calls as a plurality of data traffic streams, whereby each data traffic stream is associated with a different data terminal capability;
identifying a set of possible cell statuses associated with the cell, each possible cell status corresponding to a different set of values $\{m_1, m_2, \ldots m_N\}$ where $m_i$ represents a number of data terminals associated with the $i^{th}$ data traffic stream and N represents the total number of data traffic streams;
determining, for each possible cell status, one or more data-call death frequencies corresponding to frequencies with which data calls are terminated in the data traffic streams;
determining, for each possible cell status, one or more data-call arrival frequencies corresponding to frequencies with which data calls are initiated in the data traffic streams;
determining a set of cell status probabilities for the cell on the basis of the determined data-call arrival frequencies and data-call death frequencies; and
dimensioning the cell on the basis of the determined set of cell status probabilities.

10. A method for dimensioning a number of radio carriers in a cell of a mobile telecommunications network, the cell being suitable for managing data calls associated with data terminals having different terminal capabilities, the method comprising:
categorizing the data calls as a plurality of data traffic streams, whereby each data traffic stream is associated with a different data terminal capability;
identifying a set of possible cell statuses associated with the cell, each possible cell status corresponding to a different set of values $\{m_1, m_2, \ldots m_N\}$ where $m_i$ represents a number of data terminals associated with the $i^{th}$ data traffic stream and N represents the total number of data traffic streams;
determining, for each possible cell status, one or more data-call death frequencies corresponding to frequencies with which data calls are terminated in the data traffic streams;
determining, for each possible cell status, one or more data-call arrival frequencies corresponding to frequencies with which data calls are initiated in the data traffic streams;
determining a set of cell status probabilities for the cell on the basis of the determined data-call arrival frequencies and data-call death frequencies; and
dimensioning the cell on the basis of the determined set of cell status probabilities.

* * * * *